(12) United States Patent
Huang et al.

(10) Patent No.: US 9,621,613 B1
(45) Date of Patent: Apr. 11, 2017

(54) BITRATE ADAPTATION TRANSITIONING USING KEY FRAMES

(71) Applicant: VisualOn, Inc., San Jose, CA (US)

(72) Inventors: Cheng Huang, Shanghai (CN);
Chin-Yee Lin, Los Gatos, CA (US);
Huan-Chih Tsai, Saratoga, CA (US);
Yang Cai, Saratoga, CA (US)

(73) Assignee: VisualOn, Inc., San Jose, CA (US)

( * ) Notice: Subject to any disclaimer, the term of this patent is extended or adjusted under 35 U.S.C. 154(b) by 191 days.

(21) Appl. No.: 14/532,956

(22) Filed: Nov. 4, 2014

Related U.S. Application Data

(60) Provisional application No. 61/899,988, filed on Nov. 5, 2013.

(51) Int. Cl.
| G06F 15/16 | (2006.01) |
| H04L 29/06 | (2006.01) |
| H04N 21/647 | (2011.01) |
| H04N 21/44 | (2011.01) |
| H04N 21/239 | (2011.01) |

(52) U.S. Cl.
CPC ............ *H04L 65/602* (2013.01); *H04L 65/80* (2013.01); *H04N 21/2393* (2013.01); *H04N 21/44004* (2013.01); *H04N 21/44008* (2013.01); *H04N 21/64769* (2013.01)

(58) Field of Classification Search
CPC ... H04L 65/602; H04L 65/80; H04N 21/2393; H04N 21/44004; H04N 21/44008; H04N 21/64769

USPC .......................................................... 709/219
See application file for complete search history.

(56) References Cited

U.S. PATENT DOCUMENTS

| 8,984,569 | B2* | 3/2015 | Hurst ....................... H04L 29/06 370/465 |
| 8,997,160 | B2* | 3/2015 | Hunt ................. H04N 21/23439 709/231 |
| 9,015,335 | B1* | 4/2015 | Gigliotti ........... G06F 17/30017 348/415.1 |
| 9,131,251 | B2* | 9/2015 | Ramamurthy ..... H04N 21/2402 |
| 9,232,249 | B1* | 1/2016 | Chakrovorthy .. H04N 21/25808 |
| 9,253,233 | B2* | 2/2016 | Luby ................. H04N 21/23439 |
| 9,313,138 | B2* | 4/2016 | Sun ......................... H04L 47/38 |
| 9,338,482 | B2* | 5/2016 | Hallmarker ......... H04N 21/2343 |
| 9,354,799 | B2* | 5/2016 | Shivadas ............... G06F 3/0485 |
| 9,369,687 | B2* | 6/2016 | Braness ........... G11B 20/00086 |
| 2016/0029076 | A1* | 1/2016 | Huber ................. H04L 65/4076 725/32 |
| 2016/0142750 | A1* | 5/2016 | Huber ................... H04L 65/605 725/116 |

* cited by examiner

*Primary Examiner* — Melvin H Pollack
(74) *Attorney, Agent, or Firm* — Van Pelt, Yi & James LLP

(57) ABSTRACT

A system of video stream transitioning includes an interface and a video stream transitioner. The interface is to receive an indication for changing from a current video stream to a target video stream. The video stream transitioner is to determine key frame information in the target video stream; determine a specific key frame to switch to; and provide a request for target video stream starting at the specific key frame.

16 Claims, 7 Drawing Sheets

BITRATE ADAPTATION TRANSITIONING USING KEY FRAMES

CROSS REFERENCE TO OTHER APPLICATIONS

This application claims priority to U.S. Provisional Patent Application No. 61/899,988 entitled EARLY VIDEO KEY FRAME SEARCH TO IMPROVE BITRATE ADAPTATION STREAMING TRANSITION filed Nov. 5, 2013 which is incorporated herein by reference for all purposes.

BACKGROUND OF THE INVENTION

Dynamic adaptive streaming technology is used in several new streaming standards—for example, such as hypertext transfer protocol (HTTP) Live Streaming (HLS), Smooth Streaming and Dynamic Adaptive Streaming Over HTTP—to cover a wide range of users with different available bandwidths and/or different client hardware capabilities. In the technology, servers encode multiple streams with different bitrates, resolutions and/or profiles for each video. The clients can select and switch in different bitrates at any time based on their device capability and available bandwidths to get the best user experience. The selection and switching process is called Bitrate Adaptation (BA). Since BA involves switching from playing a current stream to playing a new stream, it can cause buffering delay, frozen video, and/or low picture quality during the transition

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Bitrate adaptation transitioning using key frames is disclosed. The system for video stream transitioning comprises an interface and a video stream transitioner. The interface is to receive an indication for changing from a current video stream to a target video stream. Video stream transitioner is to determine key frame information in the target video stream, determine a specific key frame to switch to, and provide a request for target video stream starting at the specific key frame.

Figure 1:
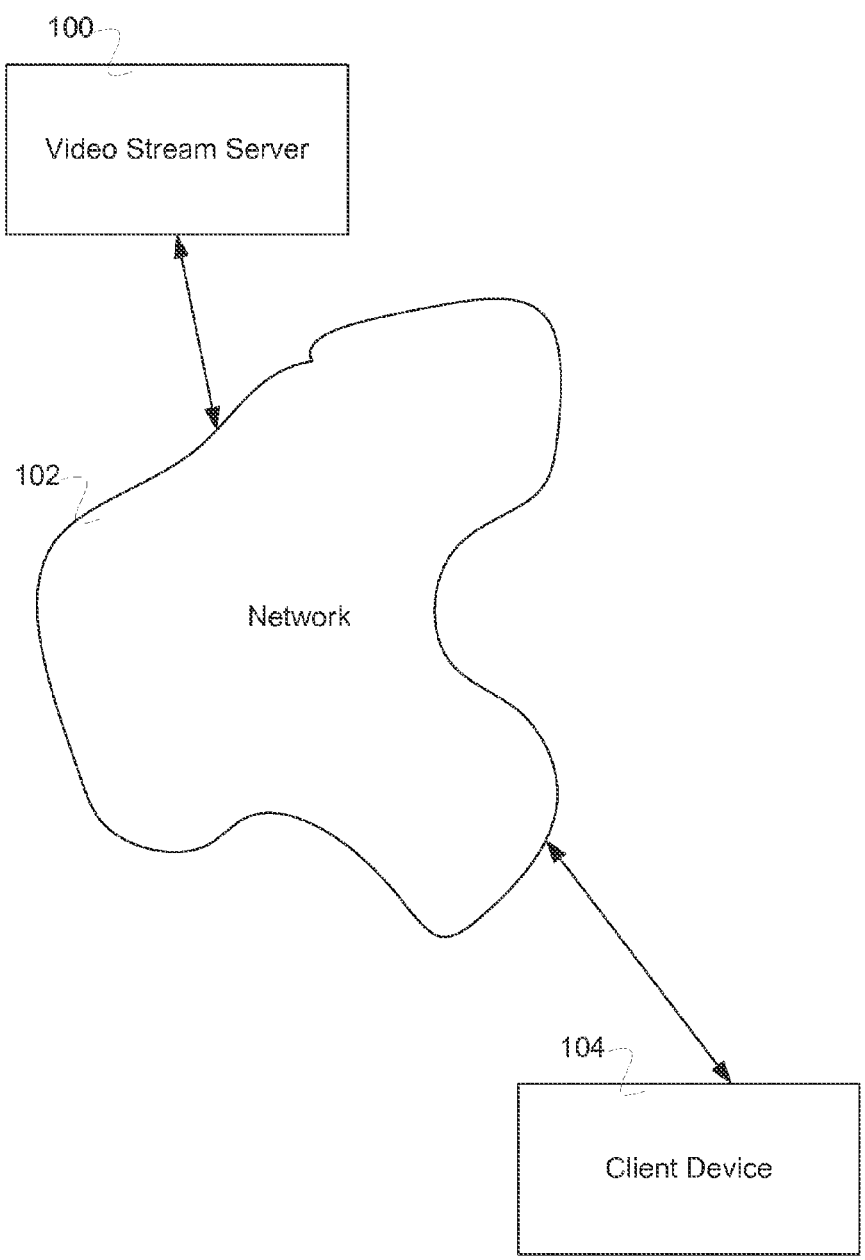
FIG. 1 is a diagram illustrating an embodiment of a system for video transitioning.

FIG. 1 is a diagram illustrating an embodiment of a system for video transitioning. In the example shown, video stream server 100 provides dynamic adaptive streaming services in which the same video content is encoded in multiple streams with different bitrates, resolutions, and/or profiles. A stream is provided using network 102 (e.g., a cellular network, the internet, a wireless network, a wired network, etc.) to one or more client devices (e.g., client device 104—for example, a computer, a tablet, a smart phone, etc.). The one or more client devices dynamically select proper streams based on the device hardware capability and current network bandwidth conditions for the best user experience. In some embodiments, client device 104 includes an interface for receiving video streams. In some embodiments, client device 104 includes a video stream transitioner for switching from playing a current stream to playing a target stream. In various embodiments, video stream transitioner transitions from a current video stream to a target video stream based on one or more of the following: a user request (e.g., higher quality, lower quality, other viewpoint, other language stream, other subtitle stream, etc.), a buffer filling rate (e.g., a fast buffer filling rate, a slow buffer filling rate, etc.), a received byte rate (e.g., a high input bandwidth, a low input bandwidth, etc.), a processor load status (e.g., too much loading—low video processing capacity, a low loading—high video processing capacity, etc.), or any other appropriate transition determiner. In some embodiments, a client device comprises a processor and a coupled memory for transitioning video streams.

For example, when mobile users use 3G to watch streaming video, the available bandwidth changes dynamically depending on users' locations and on the number of users accessing the network simultaneously. When users have high bandwidths available, the player can select a high bitrate video, such as 720p high definition (HD) video. But when the available bandwidth is reduced, the player is able to detect the reduction and can request and switch to a lower bitrate/lower resolution video stream, such as video graphics array (VGA), from the server so that the available bandwidth can support continuously smooth video playback.

In some embodiments, a stream is packed as a set of consecutive data chunks to transmit over the network. Each chunk has a time stamp to show the data synchronization between multiple streams for bitrate adaptation. A buffer (e.g., a chunk buffer pool) is usually created to smooth out the network bandwidth variation visible to a user.

Figure 2:
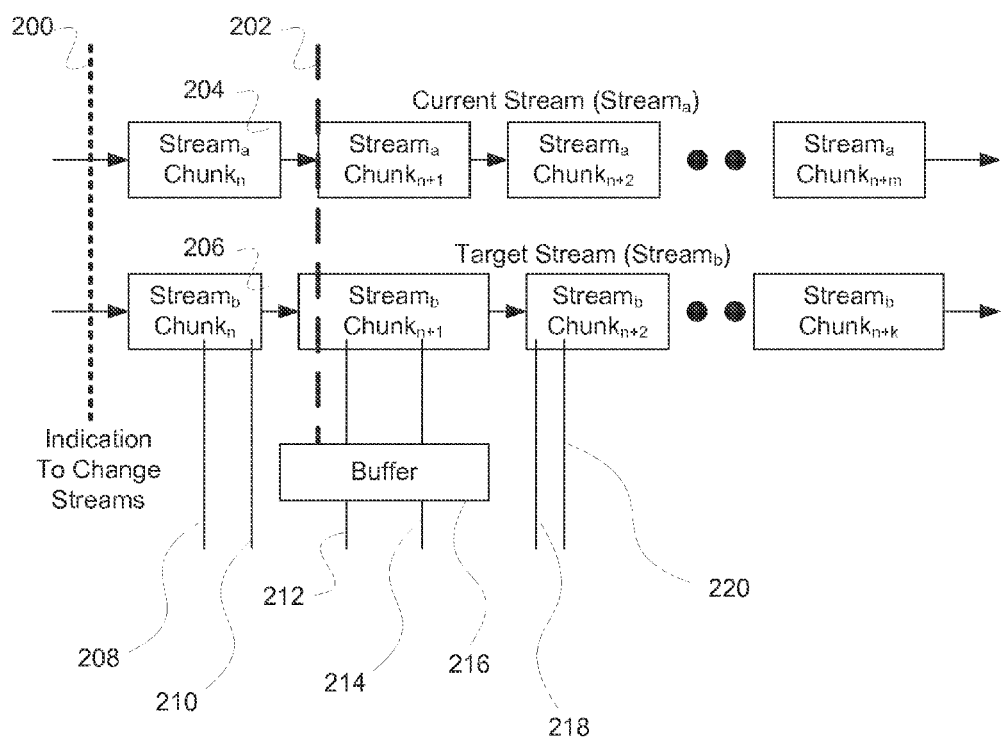
FIG. 2 is a diagram illustrating an embodiment of video stream transitioning.

FIG. 2 is a diagram illustrating an embodiment of video stream transitioning. In the example shown, current stream 204 (e.g., stream$_a$) includes stream$_a$ chunk$_n$, stream$_a$ chunk$_{n+1}$, stream$_a$ chunk$_{n+2}$, and stream$_a$ chunk$_{n+m}$. Target stream 206 (e.g., stream$_b$) includes stream$_b$ chunk$_n$, stream$_b$ chunk$_{n+1}$, stream$_b$ chunk$_{n+2}$, and stream$_b$ chunk$_{n+k}$. Note that the chunk borders are not necessarily aligned. For example, in hypertext transfer protocol (HTTP) live streaming (HLS) the chunks of different resolutions are not aligned. In some cases, upon an indication to change streams (e.g., at indication time 200 a change is indicated to a high resolution stream, a low resolution stream, etc.), the server sends the selected stream (e.g., for a desired change over time 202). The server begins providing the stream to fill buffer 216. The server does not track the contents of the stream, so the switch of the stream may take place at a point that does not allow immediate decoding.

In the example shown, target stream 206 can only be decoded starting from key frames (i.e., frames not depending on previous frame data—for example, candidate switch frames: key frame 208, key frame 210, key frame 212, key frame 214, key frame 218, and key frame 220) that will be used as a switching location. Within buffer 216, switching can be achieved at key frame 212 and key frame 214. In some embodiments, when switching from a current stream to a target stream, the client player uses a time stamp of current stream chunk at a desired time to switch (e.g., time 202) to request the chunks at the same time stamp of the target stream (e.g., or a time slightly earlier), and starts to download the data of the target stream.

In some embodiments, a typical implementation is to download from the server multiple chunks of the target stream to a chunk buffer pool (e.g., buffer 216 is large enough to hold multiple chunks). Then, the client device (e.g., a player in a client device such as client device 104) starts to find a candidate Switch Frame (e.g., key frame 212, key frame 214, etc.). The client device plays the current stream to the frame right before Switch Frame, then the client device starts to play the target stream from the Switch Frame. There are several disadvantages of the approach:
- In the buffered target stream, there is no guarantee that any given new chunk downloaded contains a key frame. So, multiple chunks have to be downloaded and buffered. This increases the buffering time and memory usage.
- For the stored current stream, the player must identify the switch frame in the downloaded multiple chunks. Once the switch frame is identified, the player knows to play up to the switch frame and then to switch to the new target stream. If the switch frame is beyond the last chunk stored of the current stream, there will be a hiccup in the playback of the video (e.g., a freeze or skipping of the video playback).

Figure 3:
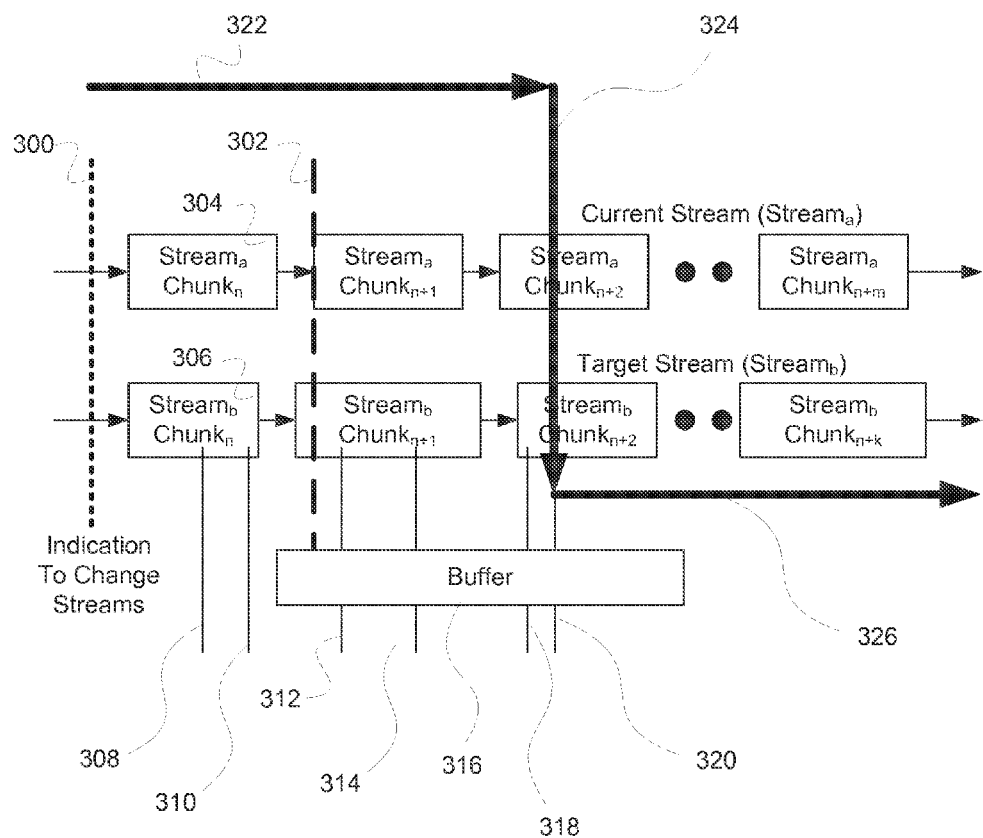
FIG. 3 is a diagram illustrating an embodiment of video stream transitioning.

FIG. 3 is a diagram illustrating an embodiment of video stream transitioning. In the example shown, an indication is received to change streams 300 from a current stream to a target stream. Current stream 304 (e.g., stream$_a$) includes stream$_a$ chunk$_n$, stream$_a$ chunk$_{n+1}$, stream$_a$ chunk$_{n+2}$, and stream$_a$ chunk$_{n+m}$. Target stream 306 (e.g., stream$_b$) includes stream$_b$ chunk$_n$, stream$_b$ chunk$_{n+1}$, stream$_b$ chunk$_{n+2}$, and stream$_b$ chunk$_{n+k}$. The system determines to switch at time 302. The system provides target stream chunks to be stored in buffer 316 starting on or before time 302. Within target stream 306 there are candidate switch frames: key frame 308, key frame 310, key frame 312, key frame 314, key frame 318, and key frame 320) that will be used as a switching location. The player plays current stream 304 during 322 and switches at a later switch frame 320 (e.g., switch stream at 324 which is later in buffer 316). The player plays target stream 306 during 326.

In various embodiments, a later switch frame is selected in the event that a higher bandwidth higher quality picture stream is desired or possible (e.g., processing and bandwidth is available as indicated by loading and pace at which the buffer is filling), or any other appropriate reason to select a later switch frame.

In some embodiments, a desired switch time comprises a time after receiving the indication to change streams that is able to be supported for storing a buffered stream of video for the target video stream that is desired to change to. In some embodiments, the desired switch time comprises a time as close to the indication to change streams as is deemed feasible.

Figure 4:
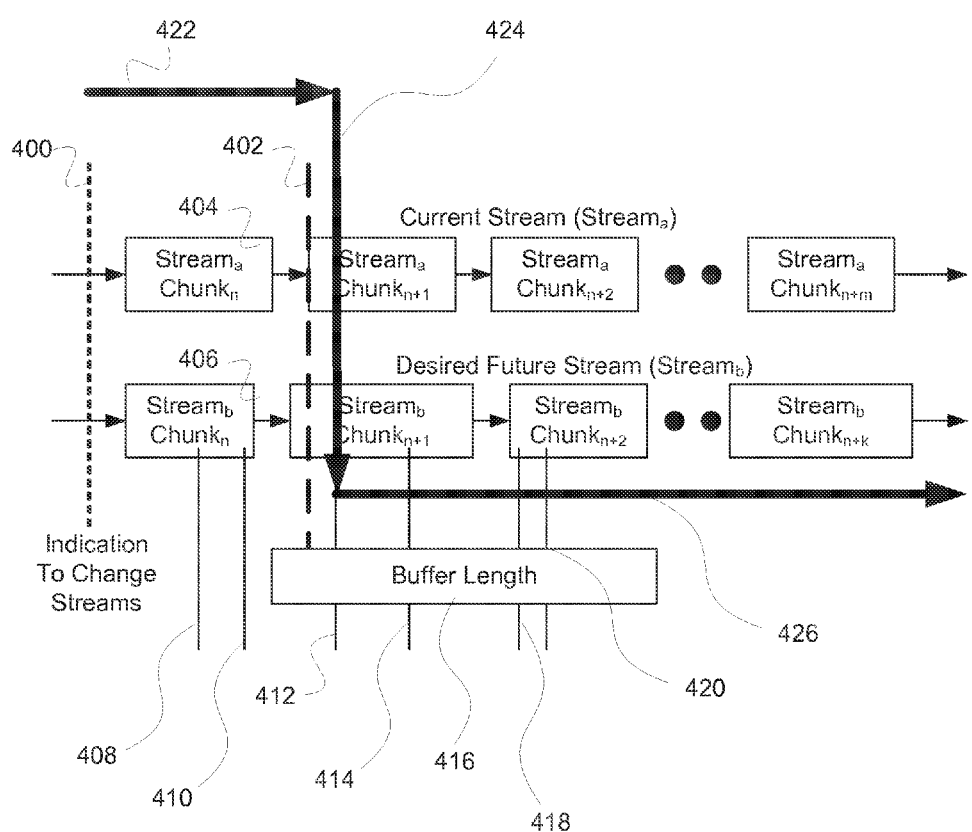
FIG. 4 is a diagram illustrating an embodiment of video stream transitioning.

FIG. 4 is a diagram illustrating an embodiment of video stream transitioning. In the example shown, an indication is received to change streams 400 from a current stream to a target stream. Current stream 404 (e.g., stream$_a$) includes stream$_a$ chunk$_n$, stream$_a$ chunk$_{n+1}$, stream$_a$ chunk$_{n+2}$, and stream$_a$ chunk$_{n+m}$. Target stream 406 (e.g., stream$_b$) includes stream$_b$ chunk$_n$, stream$_b$ chunk$_{n+1}$, stream$_b$ chunk$_{n+2}$, and stream$_b$ chunk$_{n+k}$. The system determines to switch at time 402. The system provides target stream chunks to be stored in buffer 416 starting on or before time 402. Within target stream 406 there are candidate switch frames: key frame 408, key frame 410, key frame 412, key frame 414, key frame 418, and key frame 420) that will be used as a switching location. The player plays current stream 404 during 422 and switches at an earlier switch frame 420 (e.g., switch stream at 424 which is earlier in buffer 416). The player plays target stream 406 during 426.

In various embodiments, an earlier switch frame is selected in the event that a lower bandwidth lower quality picture stream is desired (e.g., too little bandwidth, CPU load too high to handle high bit rate, battery life too short to support continued high bit rate processing, etc.), or any other appropriate reason to select an earlier switch frame.

Figure 5:
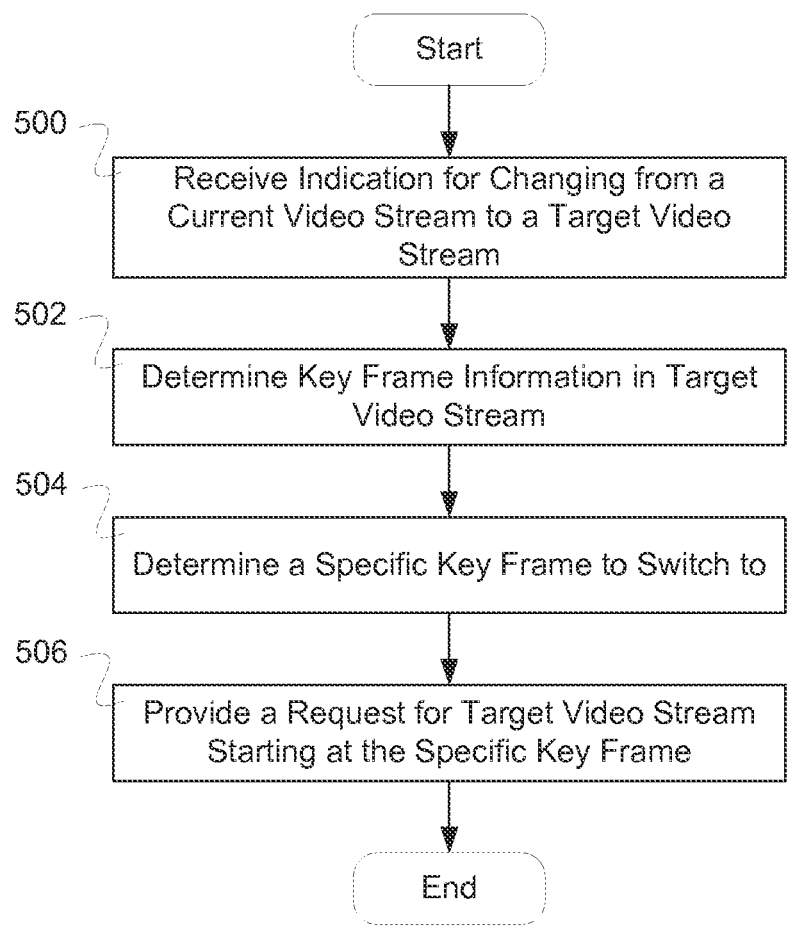
FIG. 5 is a flow diagram illustrating an embodiment of a process for video stream transitioning.

FIG. 5 is a flow diagram illustrating an embodiment of a process for video stream transitioning. In the example shown, in 500 an indication is received for changing from a current video stream to a target video stream. For example, the system or the user determines that a different stream is desired (e.g., change from a high bit rate stream to a lower bit rate stream, change from a low bit rate stream to a higher bit rate stream, change from one language stream to another language stream, change from one view stream to an alternate view stream, etc.). In 502, key frame information is determined in a target video stream. For example, key frame information is determined to identify switching times for switching between the current frame and the target frame. In some embodiments, the server is requested to provide key frame information (e.g., a server provides key frame information stored in metadata information of the format, a server provides a stream of only key frames including location information, a server provides information from which key frames can be extracted). In some embodiments, the server stores key frame information in ID3 location (e.g., metadata information) of an HLS chunk. In 504, a specific key frame is determined to switch to. For example, depending on current stream, target stream, loading of the player memory, CPU, etc. an earlier or later key frame is selected as a switch frame. In 506, a request is provided for target video stream starting at the specific key frame. For example, using the key frame information the target stream is requested starting at or prior to the selected key frame.

Figure 6:
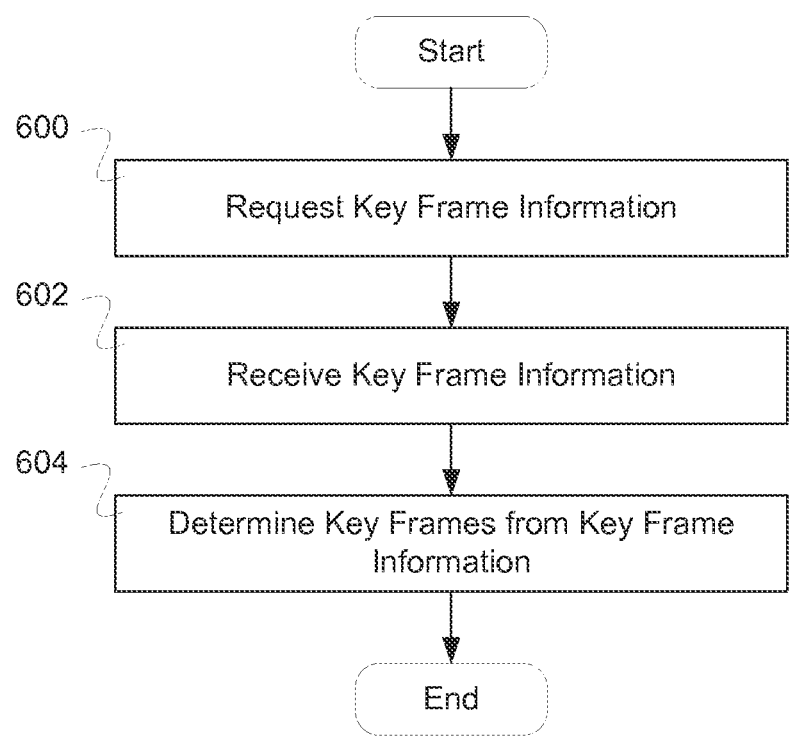
FIG. 6 is a flow diagram illustrating an embodiment of a process for determining key frames.

FIG. 6 is a flow diagram illustrating an embodiment of a process for determining key frames. In some embodiments, the process for FIG. 6 is used to implement 502 of FIG. 5. In the example shown, in 600 key frame information is requested. For example, the client device requests from the stream server key frame information. The server responds to the request by inserting information in metadata information key frame information. In some embodiments, stream server automatically inserts information into metadata information regarding key frames and no request is required to be sent and 600 is skipped. In various embodiments, key frame information is provided as a stream of key frame data, as a stream of other data, or in any other appropriate way of efficiently providing key frame data. In 602, key frame information is received. For example, key frame information is provided as separate data, as part of the stream of video data (e.g., as metadata information), as part of a stream of only key frames along with associated metadata information (e.g., including byte or time location information within the video stream), or any other appropriate manner of providing key frame information. In 604, key frames are determined from key frame information. For example, candidate key frames are determined at which a target stream can be started to be processed and displayed by a client device (e.g., a player of the client device).

Figure 7:
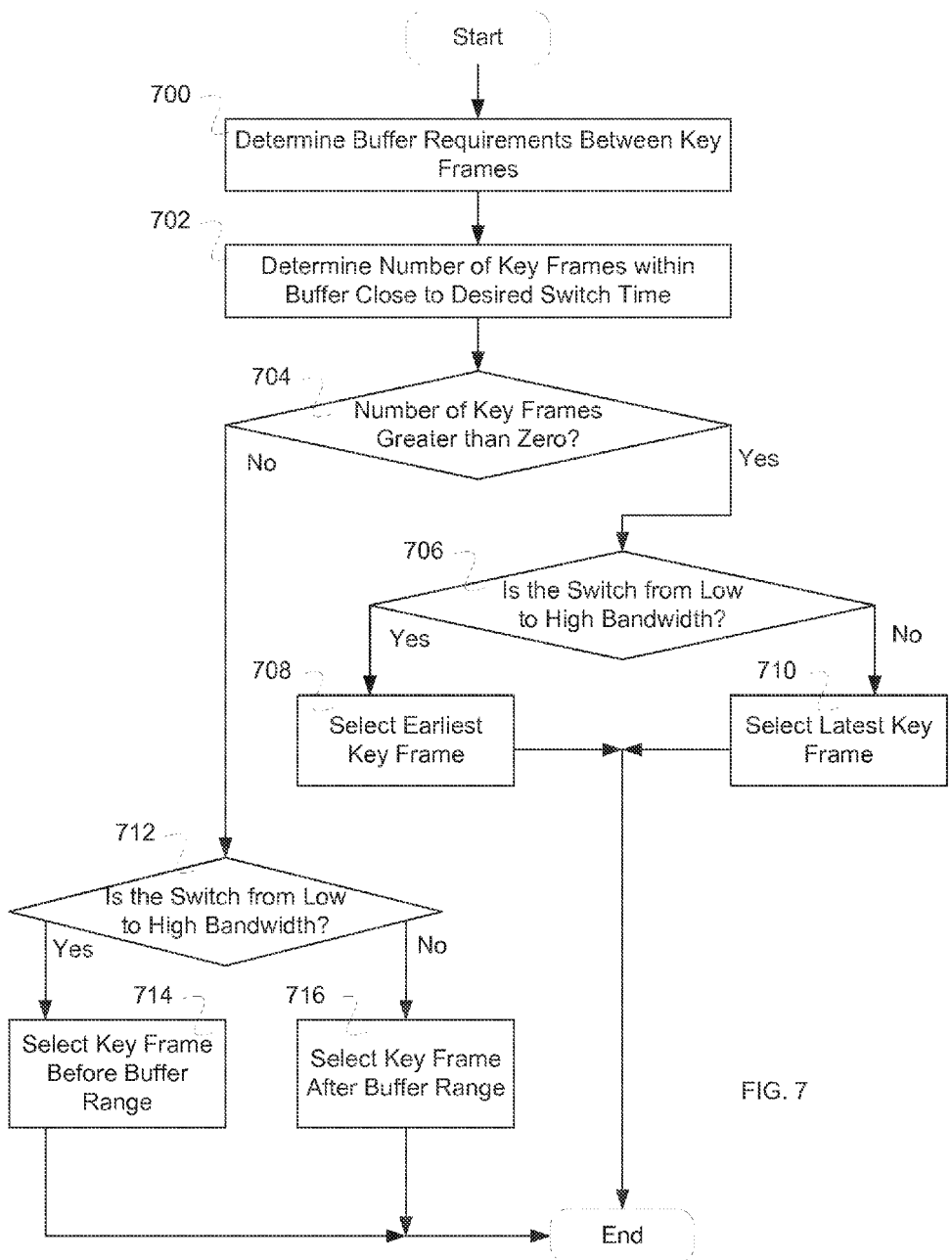
FIG. 7 is a flow diagram illustrating an embodiment of a process for selecting a key frame as switch frame.

FIG. 7 is a flow diagram illustrating an embodiment of a process for selecting a key frame as switch frame. In some embodiments, the process of FIG. 7 is used to implement 504 of FIG. 5. In the example shown, in 700 buffer requirements are determined between key frames. For example, using information of key frame locations the buffer requirements (e.g., amount of storage required) is determined. In 702, the number of key frames is determined that are within the buffer close to the desired switch time. In 704, it is determined whether the number of key frames is greater than zero. In the event that the number of key frames is greater than zero, in 706 it is determined whether the switch is from low to high bandwidth. In the event that the switch is from low to high bandwidth, in 708 the earliest key frame is selected and the process ends. In the event that the switch is not from low to high bandwidth, in 710 the latest key frame is selected and the process ends. In some embodiments, in the event that the switch is from low to high bandwidth, the latest key frame is selected, and in the event that the switch is not from low to high bandwidth, the earliest key frame is selected.

In the event that the number of key frames is not greater than zero, then in 712 it is determined whether the switch is from low to high bandwidth. In the event that the switch is from low to high bandwidth, in 714 a key frame before buffer range is selected and the process ends. In the event that the switch is not from low to high, in 716 a key frame is selected after the buffer range and the process ends. In some embodiments, the video playback skips or freezes between the end of the current stream and the playing of the target stream as started beyond the buffer range (e.g., either due to extra time to load the buffer anew or due to the running out of buffered data in the current stream). In some embodiments, in the event that the switch is from low to high bandwidth, the key frame after the buffer range is selected, and in the event that the switch is not from low to high bandwidth, the key frame before the buffer range is selected.

In some embodiments, the video playback skips of freezes between playing of the current stream and playing of the target stream as started prior to the buffer range (e.g., either due to extra time to load the buffer or skipping back prior to the same time in the playback video stream to be able to start playing the target buffer stream).

In some embodiments, switch frames are identified during or prior to downloading a portion of the regular target stream, instead of after downloading the regular target stream. During downloading (e.g., concurrent to the processing for sending the current stream), key frames in the target stream (e.g., chunks a little ahead of the current stream playing chunks) are identified as candidates for a switch frame prior to sending to the player and are included in the information sent to the player. The advantages of the approach are:

- There is no need to save data in the target stream before the switch frames since data is not used to determine location of key frames in proximity to the desired switch time that may be prior to or after the desired switch time.
- A switch frame can be selected as soon as the key frame information is received (e.g., the information about the times of the Switch Frames is received from the server). After the selection, the player can start playing all video frames in the old stream before the selected time corresponding to the switch frame in the target stream. Also, the memory can be released that is used to store the current stream for time after the selected switch frame. This reduces any potential video freezing time and allows early memory release.
- In some embodiments, the switch frame selection is updated dynamically depending on the relative speed for downloading of the current and target streams and the playback speed. For example, when switching from a high bandwidth to a low one, the system decides to use the latest key frame that is identified as the switch frame. With the selection of the latest key frame in the stream as the switch frame, users are able to enjoy the high quality video that was already downloaded into the chunk buffer pool of the current stream before switching to a low bit rate video. As long as the playback of current data does not exceed the latest key frame identified (e.g., indication received from the server), a key frame with a later time stamp can be selected as a new switch frame (e.g., as long as the data is already downloaded for the current video stream). The process can continue until the last time stamp in the chunk buffer pool of the current stream is not exceeded or until the playing speed catches up to the updated switch frame (at which point the streams are switched).
- When switching from low to high bandwidth, in some embodiments, the first key (e.g., the earliest key) frame is selected as a switch frame so that users can enjoy high quality video as early as possible.

In various embodiments, a selected key frame for switching (e.g., a switch frame) comprises an earliest frame in a buffer, a latest frame in a buffer, a frame prior to the buffer, a frame after the buffer, a frame in the middle of the buffer, or any other appropriate key frame.

In various embodiments, switching to a key frame before the buffer range occurs in the event that the target stream is of higher bitrate, is of higher resolution, or is of higher quality (e.g., current video stream is lower quality than target stream, a low to high transition); the beginning of the buffer is later than the indication to change stream; and there is no key frame in the buffer (e.g., there is not greater than zero key frames in the buffer), or any other appropriate circumstance to switch to a key frame before the buffer occurs.

In various embodiments, switching to the earliest key frame in the buffer occurs in the event that the target stream is of higher bitrate, is of higher resolution, or is of higher quality (e.g., current video stream is lower quality than target stream, a low to high transition), or any other appropriate circumstance to switch to the earliest key frame in the buffer.

In various embodiments, switching to the latest key frame in the buffer occurs in the event that the target stream is of lower bitrate, is of lower resolution, or is of lower quality (e.g., the current video stream is a higher quality than the target stream, a high to low transition); and the latest key frame is before the end of the buffered current stream data (e.g., there is greater than zero key frames in the buffer), or any other appropriate circumstance to switch to the latest key frame in the buffer.

In various embodiments, switching to a key frame after the buffer occurs in the event that the target stream is of lower bitrate, is of lower resolution, or is of lower quality (e.g., the current video stream is a higher quality than the target stream, a high to low transition); the end of the buffer is earlier than the end of the buffered current stream data; and there is no key frame in the buffer (e.g., there is not greater than zero key frames in the buffer), or any other appropriate circumstance for switching to a key frame after the buffer occurs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system of video stream transitioning, comprising:
   an interface to:
      receive an indication for changing from a current video stream to a target video stream; and
   a video stream transitioner to:
      determine key frame information in the target video stream, wherein the key frame information comprises at least two candidate key frames to switch to;
      determine a specific key frame to switch to, wherein determining the specific key frame to switch to comprises selecting one of the at least two candidate key frames as the specific key frame to switch to based at least in part on whether the target video stream requires higher bandwidth than the current video stream; and
      provide a request for target video stream starting at the specific key frame.

2. The system of claim 1, wherein determining the key frame information comprises requesting the key frame information.

3. The system of claim 1, wherein determining the key frame information comprises receiving the key frame information.

4. The system of claim 3, wherein the key frame information is received as metadata information from a video stream server.

5. The system of claim 4, wherein the metadata information comprises ID3 metadata information of a HLS chunk.

6. The system of claim 3, wherein the key frame information is received as a key frame stream from a video stream server.

7. The system of claim 1, wherein determining the key frame information comprises determining the at least two candidate key frames from the key frame information.

8. The system of claim 1, wherein determining the specific key frame to switch to further comprises determining buffer requirements between the at least two candidate key frames.

9. The system of claim 1, wherein determining the specific key frame to switch to further comprises determining a number of the at least two candidate key frames within a buffer close to a desired switch time.

10. The system of claim 1, wherein determining the specific key frame to switch to further comprises determining whether the target video stream requires higher bandwidth than the current video stream.

11. The system of claim 1, wherein determining the specific key frame to switch to further comprises determining an earliest candidate key frame of the at least two candidate key frames in a buffer.

12. The system of claim 1, wherein determining the specific key frame to switch to further comprises determining a latest candidate key frame of the at least two candidate key frames in a buffer.

13. The system of claim 1, wherein determining the specific key frame to switch to further comprises determining a candidate key frame of the at least two candidate key frames prior to a buffer.

14. The system of claim 1, wherein determining the specific key frame to switch to further comprises determining a candidate key frame of the at least two candidate key frames after a buffer.

15. A method of video stream transitioning, comprising:
   receiving an indication for changing from a current video stream to a target video stream;
   determining, using a processor, key frame information in the target video stream, wherein the key frame information comprises at least two candidate key frames to switch to;
   determining a specific key frame to switch to, wherein determining the specific key frame to switch to comprises selecting one of the at least two candidate key frames as the specific key frame to switch to based at least in part on whether the target video stream requires higher bandwidth than the current video stream; and
   providing a request for target video stream starting at the specific key frame.

16. A computer program product for video stream transitioning, the computer program product being embodied in a non-transitory computer readable storage medium and comprising computer instructions for:
   receiving an indication for changing from a current video stream to a target video stream;
   determining, using a processor, key frame information in the target video stream, wherein the key frame information comprises at least two candidate key frames to switch to;
   determining a specific key frame to switch to, wherein determining the specific key frame to switch to comprises selecting one of the at least two candidate key frames as the specific key frame to switch to based at least in part on whether the target video stream requires higher bandwidth than the current video stream; and providing a request for target video stream starting at the specific key frame.

\* \* \* \* \*